United States Patent [19]

Del Vecchio

[11] 4,035,073

[45] July 12, 1977

[54] DUPLEX REPRODUCTION MACHINE

[75] Inventor: George Del Vecchio, North Rose, N.Y.

[73] Assignee: Xerox Corporation, Stamford, Conn.

[21] Appl. No.: 606,697

[22] Filed: Aug. 21, 1975

Related U.S. Application Data

[63] Continuation of Ser. No. 494,798, Aug. 5, 1974, abandoned.

[51] Int. Cl.$^2$ .................... G03B 27/32; G03B 27/52

[52] U.S. Cl. ...................................... 355/24; 355/8; 355/11; 355/51

[58] Field of Search .............. 355/8, 11, 23, 24, 50, 355/51

[56] References Cited

U.S. PATENT DOCUMENTS

| | | | |
|---|---|---|---|
| 2,578,320 | 12/1951 | Schubert | 355/23 |
| 3,079,839 | 3/1963 | Lohner et al. | 355/24 |
| 3,318,212 | 5/1967 | Rubin | 355/24 |

*Primary Examiner*—Richard A. Wintercorn
*Attorney, Agent, or Firm*—Robert J. Bird

[57] ABSTRACT

An apparatus for photocopying information existing on both sides of a duplex document, using dual scan of a transparent sandwich platen. Duplex copies of the document document to one side of the copy sheet, and then transporting the copy sheet within the apparatus to apply a print of the second side of the document to the reverse side of the copy sheet.

12 Claims, 12 Drawing Figures

DUPLEX REPRODUCTION MACHINE

This is a continuation of application Ser. No. 494,798, filed 8/5/74, now abandoned.

BACKGROUND AND SUMMARY OF INVENTION

The present invention relates generally to the photocopying of documents, and is illustrated as applied to the copying of documents by electrostatic photography. More particularly, the present invention is directed to an improvement in the copying of duplex documents, and by the term "duplex documents" is meant a document wherein information is contained on both sides of the document sheet. Further, the present invention contemplates the reproduction of duplex documents as duplex copy, wherein both sides of the copy sheet are utilized to reproduce the two sides of the original duplex document.

The electrostatic photocopying process is well known. In one common xerographic form of electrostatic photocopying, an optical image of a document to be copied is applied to a uniformly charged photoconductive plate or photoreceptor, causing the plate to discharge in those areas which are struck by light. As a result, an electrostatic latent image of the document is formed on the photoreceptor plate. This latent image may then be developed to a visible image by the selective attraction of electroscopic toner particles to the charged areas of the latent image. Usually, the toner particles of the developed image are transferred from the photoreceptor to a receiving copy sheet so the photoreceptor can be re-used, and the transferred toner particles may then be fused to the copy sheet to form a permanent copy of the document.

Many documents carry information on both sides of the document sheet. To copy both sides of such duplex documents in the conventional mode of copier operation, first one side of the document is exposed to the copier so that an optical image of the first side is applied to the photoreceptor, then the document is turned over to expose the second side to the copier. Typically each side of the document is reproduced on a separate copy sheet, resulting in two sheets of copy for each single sheet of duplex document.

In accordance with the present invention, a duplex document is placed in a sandwich platen which is transparent of both sides, and then one side of the document sheet is exposed to the copier through one side of the platen, followed by exposure of the other side of the document through the other side of the platen. Dual optical paths are provided, so that each side of the document can be exposed to the copier automatically, and without the necessity of turning the document over. In addition, it is contemplated that the copy sheet will be processed through the copier twice, being turned over between the two traverses, so that an image of one side of the document will be reproduced on one side of the copy sheet, and an image of the other side of the document will be reproduced on the other side of the copy sheet, to provide a duplex copy of the original duplex document.

It is therefore one object of the present invention to provide for the sequential exposure of the two sides of a duplex document to a copier.

Another object of the present invention is to provide for the sequential exposure of the two sides of a duplex document to a copier, by utilizing a sandwich platen for the document, which is transparent on both sides, so each side of the document can be exposed to the copier through dual optical paths.

Sitll another object of the present invention is to provide for the foregoing sequential exposure of a duplex document, and the reproduction thereof as a duplex copy.

Other objects and advantages of the present invention will become apparent to those skilled in the art from a consideration of the following detailed description of several illustrative specific embodiments of the invention.

BRIEF DESCRIPTION OF THE DRAWINGS

The following detailed description of the invention is given in conjunction with the accompanying drawings, in which like reference characters refer to like or corresponding parts, and wherein.

DETAILED DESCRIPTION

Figure 1:
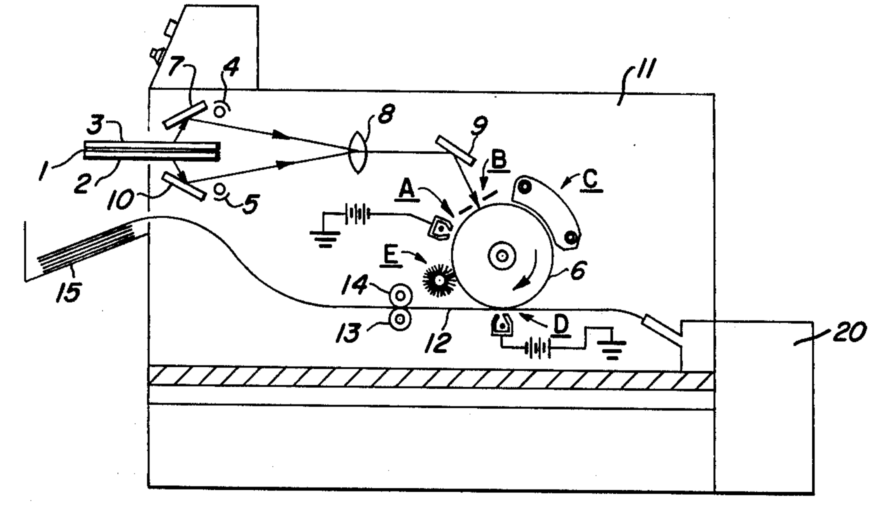
FIG. 1 is a schematic illustration of a xerographic photocopying machine showing dual optical paths for sequentially exposing the top and bottom sides of an original duplex document.

FIG. 1 schematically illustrates a duplex copying machine embodying the present invention. Within the housing 11, a conventional xerographic electrostatic reproducing apparatus is illustrated, comprising a rotating photoreceptor drum 6 having the various operational stations positioned around its periphery. At station A the photoconductive surface of the drum 6 is uniformly electrostatically charged by means of a corotron. As the drum rotates, the charged area is moved to station B where it receives an optical exposure of the document to be copied, thereby forming an electrostatic latent image of the document. At station C this latent image is developed by the selective attraction of electroscopic toner particles to the drum surface in accordance with the latent image pattern. Sheets of copy paper are fed from supply 20 along path 12 into contact with the drum 6 at station D, where the toner image on the drum is transferred to the copy sheet, which may be effected with the aid of a transfer corotron. The copy sheet then continues along path 12 to a fusing rolls 13, 14 where the toner image is permanently fixed to the copy sheet; and the copy sheet is then fed to a receiving bin 15. After toner transfer, the drum surface is cleaned of residual toner particle at station E, as may be accomplished for example by a rotating brush. The photoreceptor drum surface leaving the cleaning station E is ready to be recycled to receive another image.

The duplex photocopying feature of the invention will be best understood by reference to FIGS. 2A–2G in conjunction with FIG. 1. The document platen utilized in the practice of the invention is formed of two transparent plates 2 and 3, which may be glass or transparent plastic. These two plates are hinged at 16, and open in the manner shown in FIG. 2A to receive a duplex document sheet 1. With a document 1 in position and the platen 2, 3 closed, a cycle of operation can be initiated, starting from the position shown in FIG. 2B.

With the upper exposure lamp 4 illuminated, a rack and pinion drive 17, 18 causes the platen to traverse to the right as viewed in FIGS. 1 and 2. Simultaneously, drum 6 is rotated clockwise in synchronism with the traverse of the platen. Light from lamp 4 is reflected from the upper surface of document 1, and is then directed by mirror 7 through a focusing lens system 8, and reflected by mirror 9 to the surface of drum 6 at station B. As the platen 2, 3 continues its traverse to the right as depicted in FIGS. 2B–2D, a continuous incremental image of the upper surface of document 1 is focused on the surface of rotating drum 6, as is well understood in the art. At the completion of the traverse of the platen 2, 3 to the right, a complete image of the upper surface of document 1 is formed on the drum 6, and on continuing operation of the machine, that image will be developed at station C and then transferred to a copy sheet at station D.

Upon completion of the platen traverse to the right, a limit switch (not shown) is actuated, which turns off upper exposure lamp 4, turns on lower exposure lamp 5, and reverses the rack and pinion drive 17, 18 causing the platen 2, 3 to traverse to the left as viewed in FIGS. 1 and 2. Under these circumstances, the lower side of document 1 is illuminated, and light reflected therefrom is directed by mirror 10 through the focusing lens system 8, and by mirror 9 to the surface of photoreceptor 6 at station B. As the platen 2, 3 traverses to the left through the stages illustrated in FIGS. 2E–2G, an image of the under side of document 1 is focused on the photoreceptor drum 6, and like the image from the upper surface of document 1, this image is also developed at station C and transferred to a copy sheet at station D.

Figure 3A:
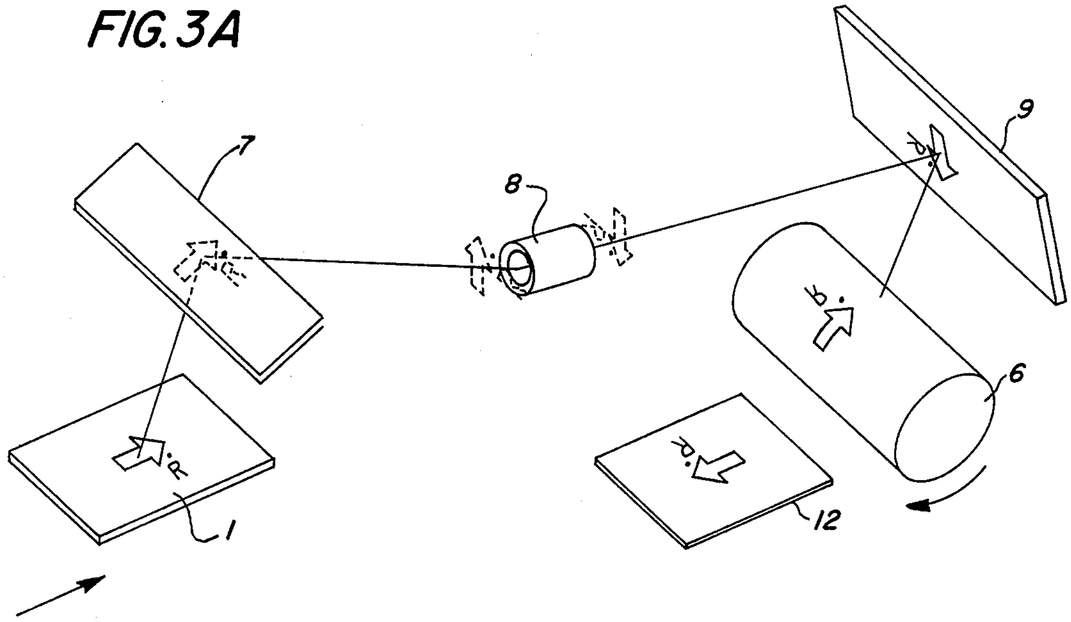
FIGS. 3A and 3B are perspective views showing how the top and bottom sides of the duplex document are respectively projected onto the photoreceptor during the two directions of traverse of the platen.
Figure 3B:
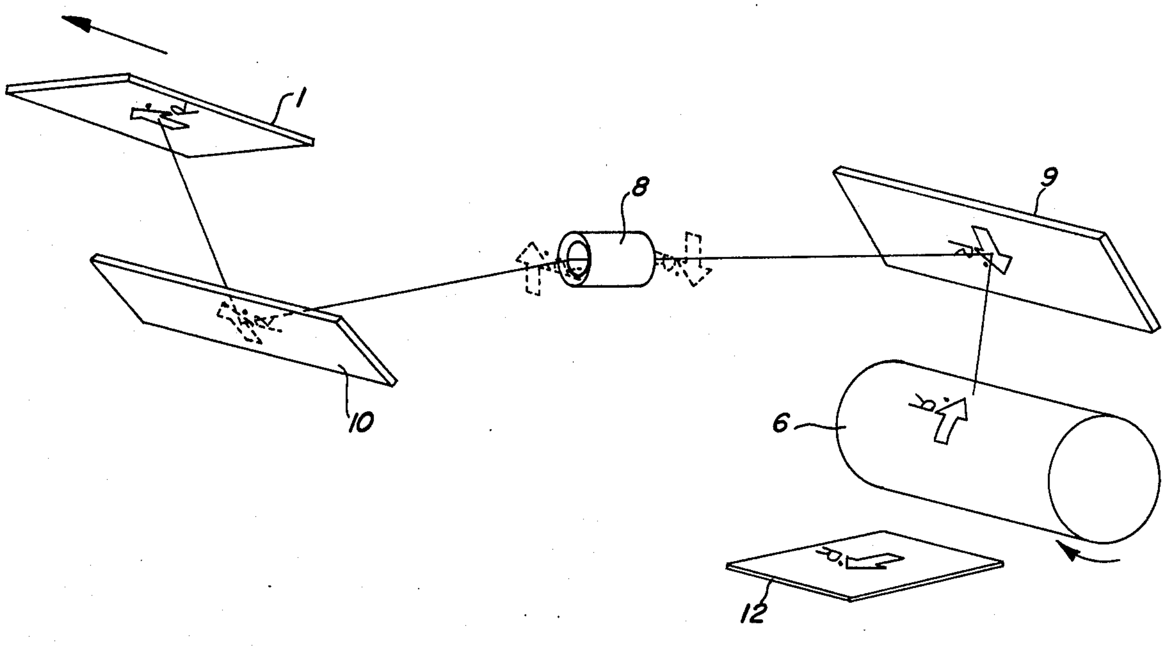

FIGS. 3A and 3B depict the optical representations of the images obtained from the document sheet 1. FIG. 3A does this for the upper surface of document 1 moving to the right, using the optical path of mirror 7, lens 8, and mirror 9.

Figure 4:
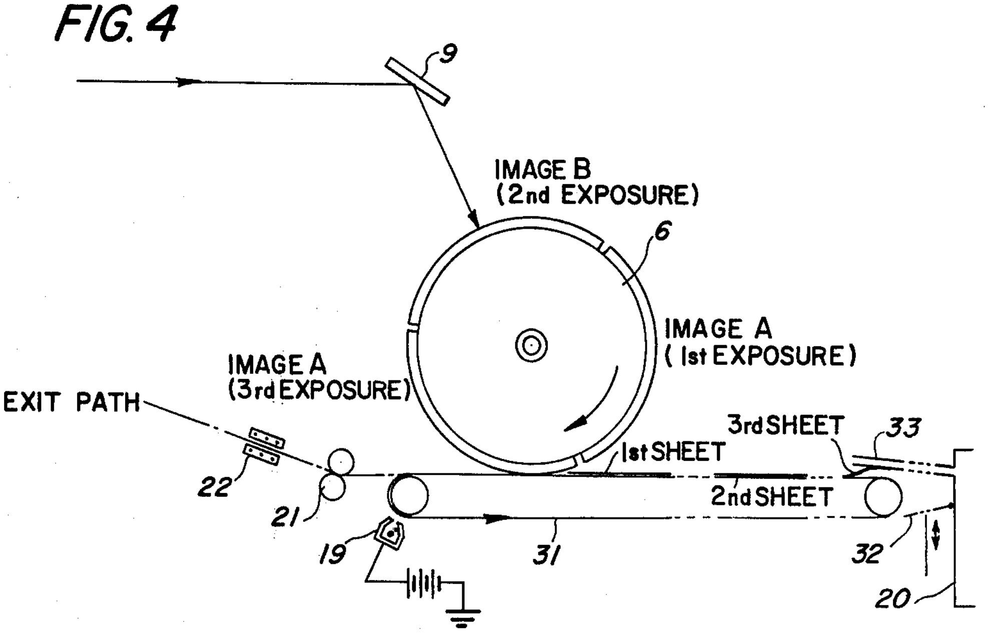
FIG. 4 shows one mode of recirculating a copy sheet to obtain duplex copy of the duplex document.

In the foregoing embodiment of the invention, the duplex original document is copied from both sides as a result of one cycle of scan of the platen 2, 3 utilizing dual optical paths. However, as depicted, the copy is simplex, i.e., each side of the document is reproduced on a separate copy sheet. It is apparent that by recirculating the copy sheet and turning it over after receiving the image of the first side of the original document, the second side of the document can be reproduced on the second side of the copy sheet. Such a mechanism is schematically illustrated in FIG. 4, for making multiple duplex copies of a duplex document. The dual optical scanning paths of FIGS. 1 and 2 are utilized for FIG. 4, but are omitted from this figure for simplifications.

As shown in FIG. 4, the photoreceptor drum 6 is divided into three image fields, and the document exposure is keyed thereto and alternates between the document top side (image A) and the document bottom side (image B). Copy sheets are fed from sheet feeder 20 to endless belt 31, in synchronism with the document exposure cycle and the positions of the image fields on drum 6. After each sheet receives its first side image from drum 6, it is retained on belt 31 by aid of tacking corotron 19 and recycles back toward the feeder 20 on the lower course of the belt, where it is received on lifter 32, raised thereby to the vacuum conveyor 33 of the sheet feeder, and returned to the upper course of the belt 31. In this process, it will be appreciated that the sheet has been turned over. It is now returned to the drum 6 to receive its second side image, after which it is removed from the conveyor belt 31 and fed by rolls 21 through a toner fuser 22, and thence to the copy receiving bin 15 shown in FIG. 1. Obviously, the length of conveyor 31 and the operation of sheet feeder 20 must be appropriately related to each other, and synchronized with the cycling rate of the document platen 2, 3 and the drum 6 to effect proper registration of each copy sheet side with the proper document image and image field on drum 6.

An illustrative timing chart for a copy sheet feed operation of three sheets per cycle of the drum 6 is presented in the following table.

TABLE

| TIME (Sec.) | 1 | 2 | 3 | 4 | 5 | 6 | 7 | 8 | 9 | 10 | 11 | 12 |
|---|---|---|---|---|---|---|---|---|---|---|---|---|
| Exposure (on Drum) | TOP A | BOTTOM B | TOP A | BOTTOM B | TOP A | BOTTOM B | TOP A | BOTTOM B | TOP A | BOTTOM B | TOP A | BOTTOM B |
| Sheet Feed | 1st | 2nd | 3rd | SKIP | SKIP | SKIP | 4th | 5th | 6th | SKIP | SKIP | SKIP |
| Recycle Sheet and turn over | | | | 1st | 2nd | 3rd | | | | 4th | 5th | 6th |
| Copies Out | | | | 1 | 2 | 3 | | | | 4 | 5 | 6 |

Figure 5:
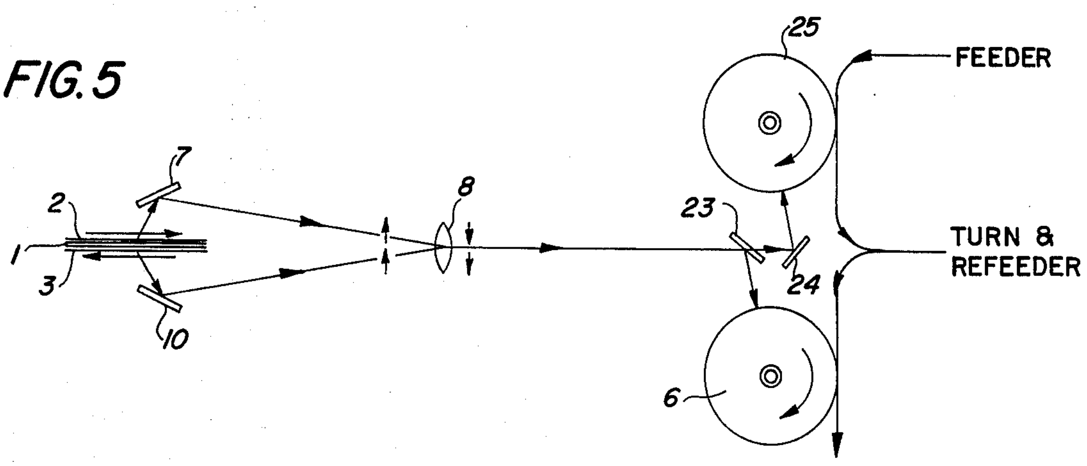
FIG. 5 shows the dual optical paths cooperating with two photoreceptors to produce duplex copy of a duplex document.
Figure 2A:
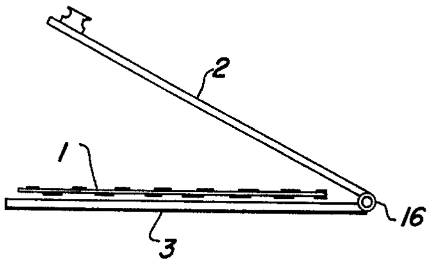
FIGS. 2A to 2G show, in sequence, how a duplex document is sandwiched between a double-sided glass platen, and how one side of the document is exposed as the platen traverses in one direction and the other side of the document is exposed as the platen traverses in the opposite direction.
Figure 2B:
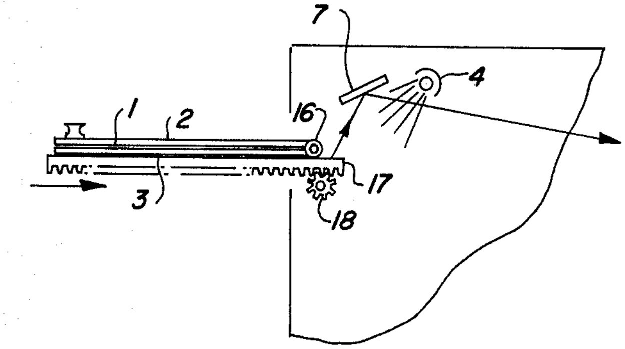
Figure 2E:
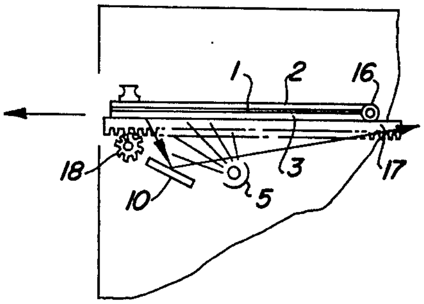
Figure 2C:
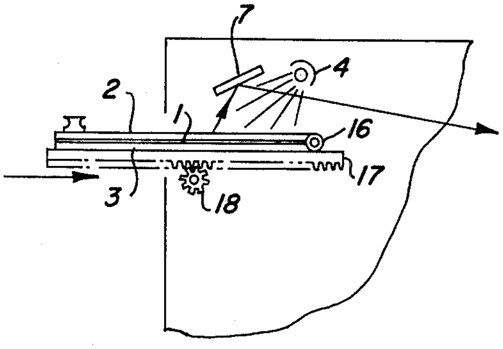
Figure 2F:
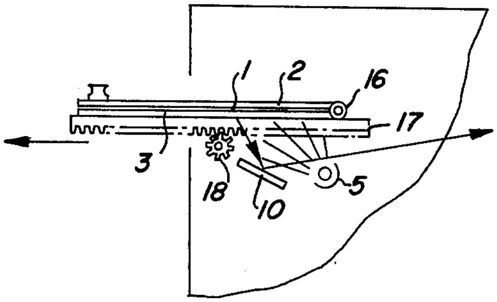
Figure 2D:
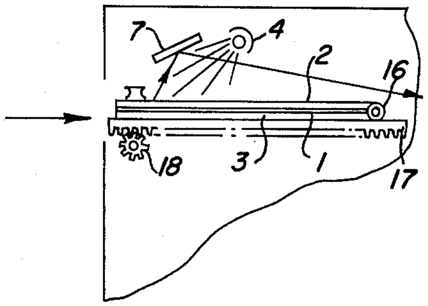
Figure 2G:
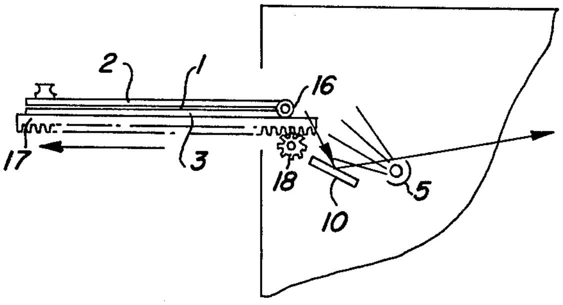

An alternative manner of producing duplex copies from a duplex document is shown in FIG. 5. Again, the system uses the same dual optical paths as described for FIG. 1 for scanning the duplex original 1 in the sandwich platen 2, 3. In this instance, a semi-transparent mirror 23 reflects the image onto photoreceptor drum 6, as in the preceding embodiments. In addition, the image transmitted by mirror 23 is reflected by mirror 24 to a second photoreceptor drum 25. Each of the drums 6 and 25 is provided with charging, developing, transfer, and cleaning stations, although they are not shown in this figure to simplify the presentation. Thus, with each cycle of traverse of platen 2, 3, latent images of one side and then of the other side of document 1 are formed on both drums 6 and 25, and these latent images are developed and transferred to receiving sheets. As schematically illustrated, a copy sheet is fed from a sheet feeder to bring one side into image transfer relation with drum 25. When the copy sheet leaves drum 25, it is turned and re-fed with the opposite side in image transfer relation with drum 6. A proper timing relationship between sheet feed, rotation of the photoreceptor drums, and the scan traverse of platen 2, 3, produces a duplex copy of the duplex document 1.

For example, upon completion of scan of side A of the document, a copy sheet from the feeder can reach the image transfer station of drum 25 to pick up image A. This copy sheet is then turned and re-fed to drum 6 as the scan of side B of the document is completed, to pick up the B image from drum 6 at its transfer station. While the first copy sheet is picking up image B from drum 6, a second copy sheet can be picking up image B from drum 25. As the system continues to cycle, the second copy sheet will be turned and re-fed to drum 6 in time to pick up image A, while a third copy sheet is fed to pick up image A from drum 25.

Accordingly, it will be appreciated that a copying system is provided for the efficient reproduction of duplex document sheets, wherein both sides of the document are scanned in sequence during one cycle of the document platen. In addition, the copy sheet can provide a duplex reproduction of the document, either by turning and recirculating the copy sheet, or by utilizing two photoreceptors and feeding the copy sheet to receive from one photoreceptor the image from one side of the document on one side of the copy sheet, and from the other photoreceptor the image from the other side of the document on the other side of the copy sheet.

While the operation of applicant's device has been described for use with a document having printing or image material on both sides of a single document, it should be understood that the term document embraces not only a single sheet of support material having image material on both sides but also two sheets of support material each having images on only one side which are thereafter placed in back-to-back relationship to provide, in effect, a double-sided document.

It is understood that the specific embodiments shown and described are presented only as illustrative of the invention. Various modifications will be apparent to those skilled in the art, and such modifications as are embraced by the spirit and scope of the appended claims are contemplated as being within the purview of the present invention.

What is claimed is:

1. In a photocopying apparatus having a platen comprising a pair of transparent plates positioned face-to-face for receiving therebetween a document to be copied and means for reproducing the document from an optical image of the document; optical means for projecting an image of the document from the platen to the reproducing means including first illuminating means for illuminating one side of the document, means for projecting an image of the side illuminated by said first illuminating means to the reproducing means, a second illuminating means for illuminating the other side of the document, means for projecting an image of the side illuminated by the second illuminating means to the reproducing means, and means for sequentially actuating the first and second illuminating means for sequentially projecting the opposite sides of the document to the reproducing means, means to provide relative reciprocal movement between the platen and said projecting means for projecting a moving image to said reproducing means, and means for selectively actuating one or the other of said two illuminating means.

2. In a photocopying apparatus having a platen comprising a pair of transparent plates positioned face-to-face for receiving therebetween a document to be copied and means for reproducing the document from an optical image of the document; optical means for projecting an image of the document from the platen to the reproducing means including first illuminating means for illuminating one side of the document, means for projecting an image of the side illuminated by said first illuminating means to the reproducing means, a second illuminating means for illuminating the other side of the document, means for projecting an image of the side illuminated by the second illuminating means to the reproducing means, and means for sequentially actuating the first and second illuminating means for sequentially projecting the opposite sides of the document to the reproducing means, means to provide relative reciprocal movement between the platen and said projecting means for projecting a moving image to said reproducing means, and means for selectively actuating one or the other of said two illuminating means and means for driving said platen through a cycle of traverse first in one direction of travel and then in the reverse direction of travel.

3. In a photocopying apparatus as set forth in claim 2, the further improvement of means for actuating only said first illuminating means during said traverse of said platen in said one direction of travel, and means for actuating only said second illuminating means during said traverse of said platen in said reverse direction of travel.

4. In a photocopying apparatus as set forth in claim 3, said reproducing means including photoreceptor means, and means for moving said photoreceptor means in synchronism with the traverse of said platen, whereby one side of a document positioned in said platen is scanned and imaged on said photoreceptor means during traverse of said platen in said one direction of travel and the opposite side of said document is scanned and imaged on said photoreceptor means during traverse of said platen in said reverse direction of travel.

5. In a photocopying apparatus as set forth in claim 4, said reproducing means including means for delivering copy sheets to said photoreceptor means to receive images carried by said photoreceptor means.

6. In a photocopying apparatus as set forth in claim 5, said copy sheet delivery means including means for delivering each copy sheet to said photoreceptor means twice and for turning each said copy sheet over between its said two deliveries, to provide a duplex copy of the two sides of a document positioned in said platen.

7. In a photocopying apparatus as set forth in claim 6, said photoreceptor means comprising a single photoreceptor, said copy sheet delivery means comprising an endless path cycling means for conveying copy sheets to said photoreceptor, and means associated with said endless path cycling means for turning copy sheets over during their travel thereon.

8. In a photocopying apparatus as set forth in claim 6, said photoreceptor means comprising two photoreceptors receiving the images projected by said optical means, said copy sheet delivery means delivering each copy sheet first to one photoreceptor and then to the other photoreceptor with one surface of the copy sheet applied to said one photoreceptor and the opposite surface of the copy sheet applied to said other photoreceptor.

9. In a photocopying apparatus as set forth in claim 8, said copy sheet delivery means including means for turning each copy sheet over after delivery to said one photoreceptor and before delivery to said other photoreceptor.

10. An optical system for projecting images from both surfaces of an object plane, in an image wavefront propagating along an axis of propagation, to an image plane, including:

means to support an object in said object plane with a first surface and a second opposite surface thereof exposed, a first optical path extending from said first surface, and including a first reflector to fold said first optical path and to rotate the image wavefront propagating therealong by 90° in a first rotational sense about an axis lying in the plane of said wavefront, a second optical path extending from said second surface and including a second reflector to fold said second optical path and to rotate the image wavefront propagating therealong by 90° in a second rotational sense, opposite to the first, about an axis lying in the plane of said wavefront, the image rotations being about parallel axes and effecting a resultant 180° difference in the orientation of the image wavefronts propagating from said first and second surfaces of said object plane, said first and second optical paths extending together through a projection lens, whereby images of said first and second surfaces respectively are projected to said image plane, illumination means to selectively illuminate said first and second surfaces of said object plane to thereby selectively expose said first and second surfaces of said object plane to said image plane.

11. An optical system for projecting images from both surfaces of an object plane, in an image wavefront propagating along an axis of propagation, to an image plane, including:

support means to support an object in said object plane with a first surface and a second opposite surface thereof exposed, a first optical path extending from said first surface, and including a first reflector to fold said first optical path and to rotate the image wavefront propagating therealong by 90° in a first rotational sense about an axis lying in the plane of said wavefront, a second optical path extending from said second surface and including a second reflector to fold said second optical path and to rotate the image wavefront propagating therealong by 90° in a second rotational sense, opposite to the first, about an axis lying in the plane of said wavefront, the image rotations being about parallel axes and effecting a resultant 180° difference in the orientation of the image wavefronts propagating from said first and second surfaces of said object plane, said first and second optical paths extending together through a projection lens, whereby images of said first and second surfaces respectively are projected to said image plane, first and second illumination means to selectively illuminate respectively said first and second surfaces of said object plane to thereby selectively expose said first and second surfaces of said object plane to said image plane, means to provide relative reciprocatory scanning movement between said support means and said optical paths for projecting a flowing image to said image plane, and means for sequentially operating said first and second illumination means in successive directions of reciprocatory scanning movement for sequentially exposing said first and second surfaces of said object plane to said image plane.

12. A photocopying apparatus having a support means for receiving at an object plane a two-sided object to be copied and means for reproducing the object from an optical image of the object at an image plane, including:

an optical system providing simultaneous optical communication from both sides of the object to the image plan, said optical system including first illuminating means for illuminating one side of the object, means for projecting an image of the side illuminated by said first illuminating means to the image plane, second illuminating means for illuminating the other side of the object, means for projecting an image of the side illuminated by the second illuminating means to the image plane, means to provide relative reciprocal scanning movement between the support means and the optical system for projecting a flowing image onto said reproducing means at said image plane, means to sequentially actuate said first illuminating means during scanning movement in a first direction and said second illuminating means during scanning movement in the opposite direction so as to sequentially expose the opposite sides of the object to the reproducing means, whereby upright ordered images of the opposite sides of the object are successively composed at said image plane.

* * * * *

Disclaimer

4,035,073.—*George Del Vecchio,* North Rose, N.Y. DUPLEX REPRODUCTION MACHINE. Patent dated July 12, 1977. Disclaimer filed Apr. 16, 1981, by the assignee, *Xerox Corp.*

Hereby enters this disclaimer to claims 1-6 and 8-12 inclusive of said patent.

[*Official Gazette July 14, 1981.*]